United States Patent [19]
Nohara et al.

[11] Patent Number: 5,966,185
[45] Date of Patent: Oct. 12, 1999

[54] ELECTRONIC EQUIPMENT AND METHOD OF CONTROLLING ELECTRONIC EQUIPMENT

[75] Inventors: Satoshi Nohara, Saitama; Yoshiko Konuma, Kanagawa, both of Japan

[73] Assignee: Sony Corporation, Tokyo, Japan

[21] Appl. No.: 08/791,224

[22] Filed: Jan. 30, 1997

[30] Foreign Application Priority Data

Feb. 6, 1996 [JP] Japan .................................. 8-019637

[51] Int. Cl.$^6$ .............................. H04N 5/44; H04N 17/00
[52] U.S. Cl. ...................... 348/553; 348/725; 348/552; 348/180
[58] Field of Search ................................... 348/734, 725, 348/731, 552, 553, 569, 570, 567, 180, 184, 185; 324/500, 158.1; 340/825, 825.06, 853.2; 364/470.14, 186; 365/201; 371/25.1; H04N 5/44, 17/00

[56] References Cited

U.S. PATENT DOCUMENTS

| | | | |
|---|---|---|---|
| 4,743,968 | 5/1988 | Mogi et al. | 358/147 |
| 5,325,196 | 6/1994 | Yoshimi et al. | 348/180 |
| 5,410,650 | 4/1995 | Sasaki et al. | 395/200 |
| 5,414,862 | 5/1995 | Suzuki et al. | 395/750 |
| 5,444,499 | 8/1995 | Saitoh | 348/734 |
| 5,488,357 | 1/1996 | Sato et al. | 348/734 |
| 5,589,878 | 12/1996 | Cortjens et al. | 348/734 |
| 5,790,189 | 8/1998 | Moon | 348/189 |
| 5,790,878 | 8/1998 | Anderson et al. | 348/552 |

*Primary Examiner*—John K. Peng
*Assistant Examiner*—Jean W. Désir
*Attorney, Agent, or Firm*—Frommer Lawerence & Haug, LLP.; William S. Frommer

[57] ABSTRACT

A microcomputer gives instructions to a sound processor to set a value of a volume prescribing a sound volume outputted through a speaker to a predetermined value as a parameter. The sound processor stores the value of the parameter in a RAM and sets a sound volume corresponding to the value of stored parameter. The microcomputer reads the value of parameter which is set practically by a sound processor, and decides whether the value of the parameter is different from the value that the setting thereof has been instructed or not, and decides that abnormality has been generated in the sound processor when they are different from each other, thus making it possible to detect generation of abnormality in an apparatus that has no function of detecting generation of abnormality.

12 Claims, 6 Drawing Sheets

(THE FIRST EMBODIMENT)

(THE FIRST EMBODIMENT)

(THE SECOND EMBODIMENT)

(THE THIRD EMBODIMENT)

ELECTRONIC EQUIPMENT AND METHOD OF CONTROLLING ELECTRONIC EQUIPMENT

BACKGROUND OF THE INVENTION

1. Field of the Invention

The present invention relates to electronic equipment and a method of controlling electronic equipment, and more particularly to a monitor and a monitoring method that are made capable of detecting abnormality of a circuit apparatus inside a television receiver accurately.

2. Description of Related Art

FIG. 5 shows a structural example of an audio portion of a conventional television receiver. A microcomputer 41 includes a RAM 51, and is made to control a sound processor 43 corresponding to a command from an input portion 42. The sound processor 43 includes a RAM 61 inside, processes audio data and outputs the processed data to a speaker 44.

Next, the operation thereof will be described. The microcomputer 41 executes processing shown in a flow chart in FIG. 6 when a power source of a television receiver is turned ON. First, in a step S51, start-up processing is executed. In this start-up processing, the microcomputer 41 initializes the sound processor 43, and outputs values of various parameters to the sound processor 43 in accordance with a predetermined sequence. The sound processor 43 decides the existence of abnormality by itself in accordance with the initialization processing as described later with reference to FIG. 7, and outputs abnormality detection data when abnormality is found (a step S62 in FIG. 7).

Now, in a next step S52, the microcomputer 41 decides whether abnormality detection data have been received from the sound processor 43 or not. When the abnormality detection data have not been received, the process proceeds to a step S53, where it is decided whether a preset certain time has elapsed or not. When a certain time has not elapsed, the process is returned to the step S52, and processing thereafter is executed repeatedly.

When it is decided in the step S53 that a certain time has elapsed, the process is proceeded to a step S54, where the microcomputer 41 outputs the value of a parameter which has been set at the point of time (the input processing thereof will be described later with reference to a flow chart shown in FIG. 8) when the input portion 42 is operated by a user. Then, the process is returned to the step S52, and processing thereafter is executed repeatedly.

As described above, unless the sound processor 43 outputs abnormality detection data, the microcomputer 41 transfers every time when a certain time elapses the value of a parameter the setting of which has been instructed at that point of time to the sound processor 43, thereby to have the value of the parameter set therein.

Then, in the step S52, when it is decided that the sound processor 43 has outputted abnormality detection data, the process is returned to the step S51, and start-up processing is executed.

On the other hand, when a command to start up processing is inputted from the microcomputer 41, the sound processor 43 executes the processing shown in a flow chart in FIG. 7. Namely, in a step S61 first, it is decided whether abnormality has been generated or not in point of processing. Then, when abnormality is not generated, the processing in the step S61 is executed repeatedly, and, when abnormality has been generated, the process is proceeded to a step S62, and abnormality detection data are outputted to the microcomputer 41.

In such a manner, when the abnormality detection data are outputted from the sound processor 43, the microcomputer 41 decides in the step S52 in FIG. 6 that the abnormality detection data have been received and executes start-up processing in the step S51.

On the other hand, when a volume of a sound outputted from the speaker 44 is regulated for instance, a user operates the input portion 42 so as to instruct the microcomputer 41 to set a predetermined volume quantity. The microcomputer 41 executes parameter input processing shown in a flow chart in FIG. 8 when a predetermined command is inputted from the input portion 42.

First, in a step S71, the microcomputer 41 stores the value of a parameter corresponding to an operation quantity inputted from the input portion 42 in the RAM 51 included inside. Then, the value of the parameter stored in the RAM 51 is outputted to the sound processor 43 in a step S72.

The sound processor 43 executes the processing shown in a flow chart in FIG. 9 when it receives a predetermined parameter from the microcomputer 41. Namely, first, in a step S81, the value of the parameter inputted from the microcomputer 41 is stored in a RAM 61 included inside. Then, in a step S82, the value of the parameter stored in the RAM 61 is read out and set processing corresponding to the value of the parameter is performed. In this case, the value of the volume outputted to the speaker 44 is set to the value of the parameter inputted from the microcomputer 41.

As described above, the microcomputer 41 monitors whether the sound processor 43 shows abnormal action or not, and, when abnormality is detected, the sound processor 43 is reset in the similar manner as the time of starting up the power source, and a procedure of having the sound processor 43 act from the beginning is executed.

As described above, in a conventional apparatus, the sound processor 43 detects by itself whether abnormality has been generated or not, and, when abnormality is generated, notifies the microcomputer 41 to that effect. Thus, there has been such a subject that the microcomputer 41 cannot detect abnormality in the case of a sound processor that has no function of detecting generation of abnormality by itself or a sound processor that has no function of notifying the abnormality to the outside even when it is detected.

Further, there is also such a case that, even in the case of a sound processor having a function of outputting abnormality detection data, the power source is turned OFF once because of power breakdown for instance, abnormality is generated once in the sound processor 43, the power breakdown is recovered thereafter, and electric power becomes to be supplied again, thus returning to a normal state. In such a case, there has been such a subject that, even if the value of the parameter is set to an abnormal value at time of abnormality, the value is regarded as a normal value and it becomes difficult to detect the value as an abnormal value.

Even when abnormality is generated because of instant power breakdown or the like, the sound processor 43 generates an abnormally large sound at time of recovery sometimes when the power breakdown is recovered soon.

As described with reference to the steps S53 and S54 shown in FIG. 6, the microcomputer 41 sets the value of the parameter stored in the RAM 51 at that time to the sound processor 43 repeatedly at intervals of certain time so that a proper value of a parameter may be set even when abnormality has been generated. Once abnormality is generated, however, the abnormal state cannot be recovered sometimes only by resetting the value of the parameter. In such a case, the abnormal state cannot be returned to a normal state eventually.

SUMMARY OF THE INVENTION

The present invention has been made in view of such circumstances, and makes it possible to detect the existence of abnormality quickly and surely.

Electronic equipment according to claim 1 has a microcontroller for controlling a plurality of circuit portions connected to an internal bus through the internal bus, in which the plurality of circuit portions have a plurality of parameters that are set by the microcontroller, respectively and are provided each with a memory for storing set values for the parameters that have been-sent from the microcontroller through the bus, and the microcontroller outputs the set values of a plurality of parameters to a plurality of circuit portions so as to store these set values in the memories of the plurality of circuit portions, and detects an abnormal state by reading the set values out of the memories of the plurality of circuit portions after lapse of a predetermined time and comparing the set values that have been sent to the plurality of circuit portions with the read out set values.

According to a method of controlling electronic equipment set forth in Claim 7, a plurality of circuit portions connected mutually by an internal bus are controlled by that the set values of the parameters are given from the microcontroller connected to the internal bus, and the microcontroller outputs the set values of a plurality of parameters to the plurality of circuit portions, stores the set values in the memories provided in the plurality of circuit portions, respectively, reads out the set values from the memories after the lapse of a predetermined time, and detects an abnormal state by comparing the set values that have been sent to a plurality of circuit portions with the read out set values.

DETAILED DESCRIPTION OF THE PREFERRED EMBODIMENTS

Figure 1:
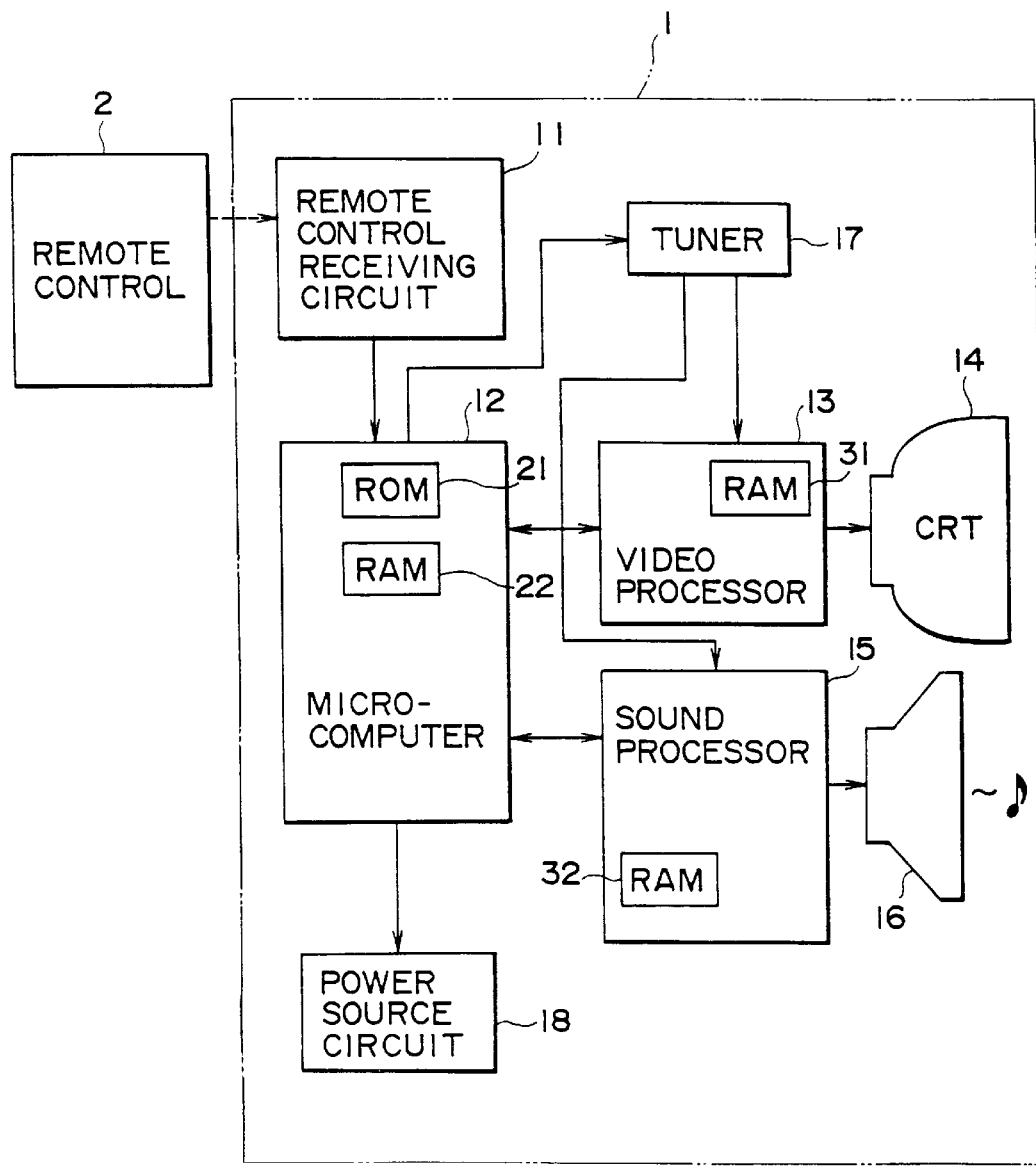
FIG. 1 is a block diagram showing a structural example of a television receiver in which electronic equipment of the present invention is applied.

FIG. 1 shows a structural example of a television receiver in which electronic equipment of the present invention is applied. In the present embodiment, a television receiver 1 is controlled remotely with an infrared signal by means of a remote commander (remote control) 2.

The television receiver 1 has a remote control receiving circuit 11 for receiving an infrared signal outputted from the remote control 2, and the remote control receiving circuit 11 outputs, when an infrared signal is received, a detection signal thereof to a microcomputer 12. The microcomputer 12 controls respective parts in accordance with a program stored in a ROM 21, and stores necessary data, programs or the like appropriately in a RAM 22.

A tuner 17 demodulates a television broadcasting signal received through an antenna not shown, outputs the video signal thereof to a video processor 13, and outputs an audio signal to a sound processor 15. The video processor 13 processes the inputted video signal and outputs it to a CRT 14. Further, the sound processor 15 processes the inputted audio signal and outputs it to a speaker 16.

The video processor 13 includes a RAM 31 inside, and the sound processor 15 includes a RAM 32 inside. In these RAMs 31 and 32, the values of parameters outputted from the microcomputer 12 are stored, and the video processor 13 or the sound processor 15 is made to execute processing of setting various parameters so as to set the values of the parameters stored in the RAM 31 or 32, respectively.

A power source circuit 18 is controlled by the microcomputer 12, and supplies electric power required for the video processor 13, the sound processor 15 and so on.

Next, the operation of the embodiment shown in FIG. 1 will be described with reference to a flow chart shown in FIG. 2. When it is instructed to turn on the power source by operating the remote control 2, a signal corresponding to the instruction is supplied to the microcomputer 12 through the remote control receiving circuit 11. At this time, the microcomputer 12 controls the power source circuit 18 so as to supply required electric power to respective parts, and starts processing shown in the flow chart in FIG. 2 at the same time.

First, in a step S1, the microcomputer 12 executes start-up processing. Namely, the microcomputer 12 performs initialization processing on the video processor 13 and the sound processor 15, and reads the values of various parameters to be set out of the ROM 21 so as to supply these values in accordance with a predetermined sequence. These values of the parameters are stored in the RAM 31 of the video processor 13 or the RAM 32 of the sound processor 15. The video processor 13 and the sound processor 15 execute processing of setting parameters in accordance with the values of parameters stored in the RAM 31 or 32.

Further, the microcomputer 12 controls the tuner 17 so as to receive an electric wave of a channel stored in advance as a default in the ROM 21. The tuner 17 receives an electric wave of the instructed channel corresponding to a control signal from the microcomputer 12 and demodulates it. Then, the video signal and the audio signal are outputted to the video processor 13 and the sound processor 15, respectively. The video processor 13 and the sound processor 15 process inputted signals, respectively, and output the processed signals to the CRT 14 or the speaker 16.

On the other hand, although the video processor 13 or the sound processor 15 has a function of setting parameters, the microcomputer 12 reads out in a step S2, predetermined values $R_1$ and $R_2$ stored in the ROM 21 as the values of parameters r1 and r2 that are not used in point of design in the television receiver 1.

For example, when the video processor 13 and the sound processor 15 have parameters for setting functions of processing signals from satellite broadcasting, but the tuner 17 has no function of receiving satellite broadcasting, it is possible to use parameters of satellite broadcasting as the parameters $r_1$ and $r_2$.

Next, the process is proceeded to a step S3, and the microcomputer 12 outputs the values $R_1$ and $R_2$ that have been read out of the ROM 21 as the values of the parameters $r_1$ and $r_2$ to the video processor 13 and the sound processor 15. The video processor 13 and the sound processor 15 store these values $R_1$ and $R_2$ in the RAMs 31 and 32.

Next, the process is proceeded to a step S4, and the microcomputer 12 stands by until a preset certain time elapses, proceeds to a step S5 when a certain time has elapsed, and executes processing of reading the values of the parameters $r_1$ and $r_2$ that are set practically in the video processor 13 and the sound processor 15. The video processor 13 and the sound processor 15 perform various processing based on the values of various parameters stored in the RAMs 31 and 32, and, when no abnormality has been generated in the video processor 13 and the sound processor 15, the values of the parameters $r_1$ and $r_2$ should remain unchanged since these parameters are those that are not used originally. As against the above, when an abnormality has been generated in the video processor 13 and the sound processor 15, it is quite within the bounds of possibility that the values of these parameters $r_1$ and $r_2$ have been updated to values different from values $R_1$ and $R_2$ that have been set in the step S3.

Now, in a step S6, the microcomputer 12 decides whether the values of the parameters $r_1$ and $r_2$ that have been read in the step S5 are equal to the values $R_1$ and $R_2$ that have been read out of the ROM 21 in the step S2 or not. When either values are equal, it is decided that the video processor 13 and the sound processor 15 are acting normally, and the process is proceeded to a step S7. In the step S7, the values of various parameters stored in the RAM 22 at that point of time (that are used at that time in the video processor 13 and the sound processor 15) are read out, and are outputted to the video processor 13 and the sound processor 15.

When the values of various parameters are inputted from the microcomputer 12, the video processor 13 and the sound processor 15 update the values of parameters that have been stored so far in the RAMs 31 and 32 with the values of newly inputted parameters. With this, even when the values of parameters practically in use have been updated to abnormal values that are not instructed by the microcomputer 12 for some reason or other in the video processor 13 and the sound processor 15, these values are updated to normal values. With this, it is controlled that the video processor 13 and the sound processor 15 perform an abnormal action.

The process is returned to the step S4 following to the step S7, stands by until a certain time elapses again, and similar processing is executed repeatedly when a certain time has elapsed.

Further, in the step S6, when it is decided that the value of the parameter $r_1$ does not coincide with the value $R_1$, or when it is decided that the value of the parameter $r_2$ does not coincide with the value $R_2$, it is decided that there is some abnormality in the video processor 13 or the sound processor 15, the process is returned to the step S1, and the processing at start-up processing when the power source is turned on in the video processor 13 or the sound processor 15 or thereafter is executed.

As described, since the microcomputer 12 detects the existence of abnormality using parameters that are not used practically by the video processor 13 or the sound processor 15 in the present embodiment, it becomes possible to detect the abnormality even when the video processor 13 or the sound processor 15 has no function of outputting abnormality detection data.

Figure 8:
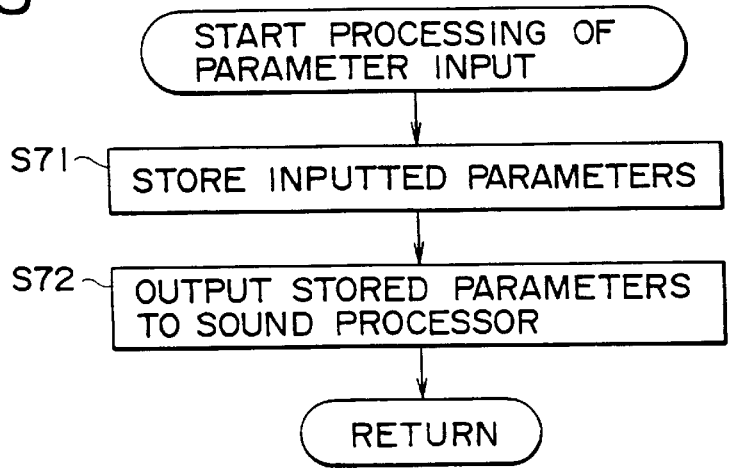
FIG. 8 is a flow chart showing a processing example at time of inputting parameters by the microcomputer shown in FIG. 5.

Besides, in the present embodiment, the microcomputer 12 also executes processing shown in a flow chart in FIG. 8 when an input of instructing alteration of the parameters is made by the remote control 2, stores the values of the inputted parameters in the RAM 22 in the step S71, and outputs the values of the parameters stored in the RAM 22 to the video processor 13 or the sound processor 15 in a step S72.

Figure 9:
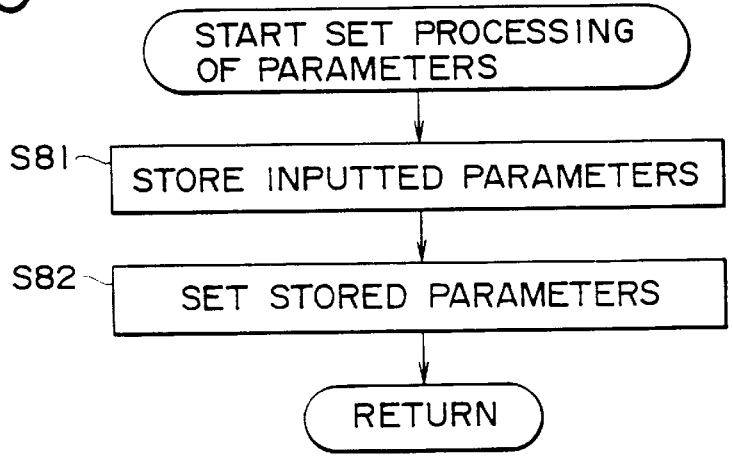
FIG. 9 is a flow chart showing a processing example of parameter set processing by the sound processor shown in FIG. 5.

Then, the video processor 13 or the sound processor 15 executes the processing shown in a flow chart in FIG. 9 when the values of updated parameters are inputted by the microcomputer 12. Namely, in a step S81, the values of parameters inputted from the microcomputer 12 are stored in the RAMs 31 and 32, and, in a step. S82, processing for setting the values of parameters that have been stored in the RAMs 31 and 32 as the values of parameters for processing video or audio data.

Figure 2:
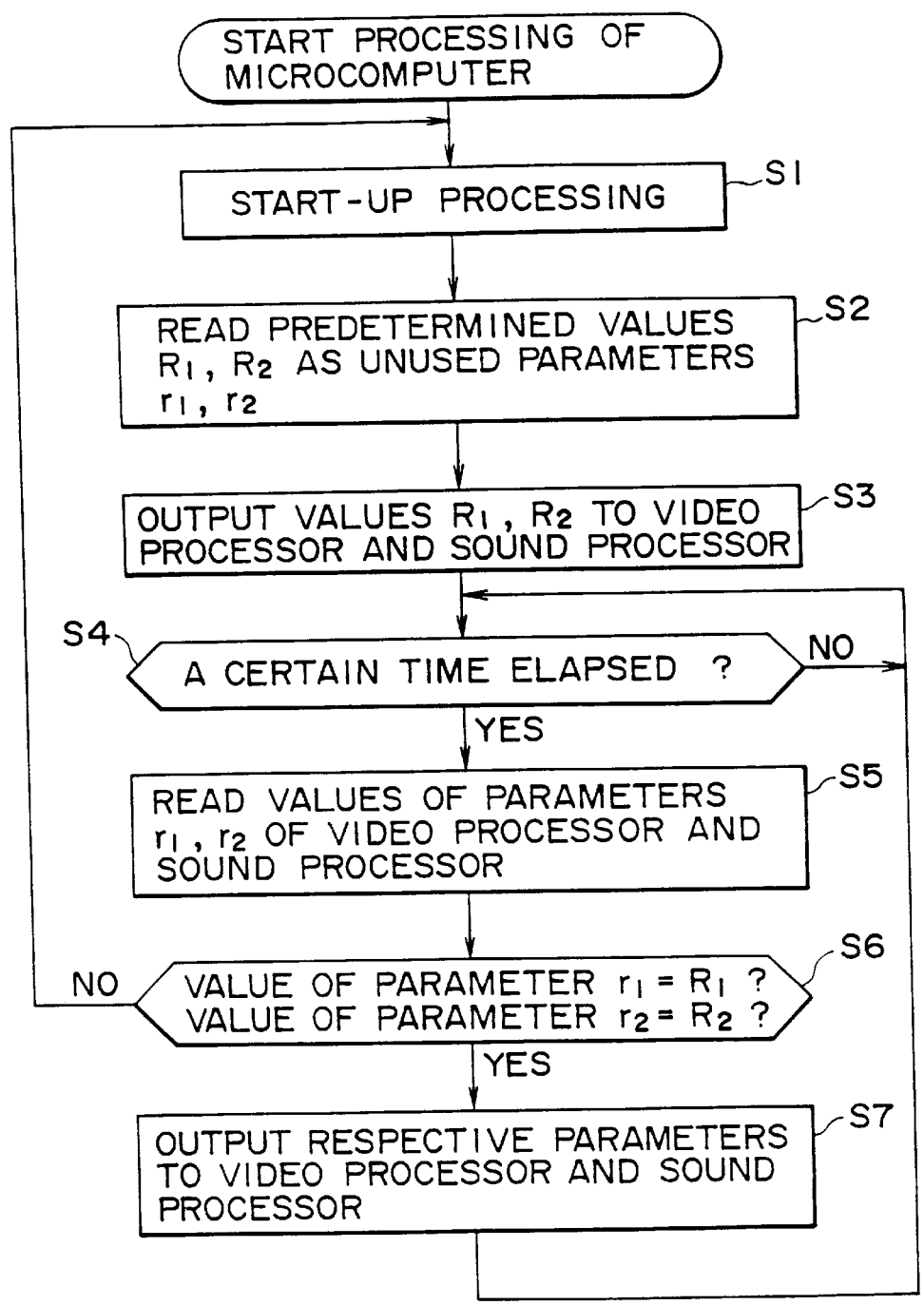
FIG. 2 is a flow chart for explaining the operation of the embodiment shown in FIG. 1.
Figure 3:
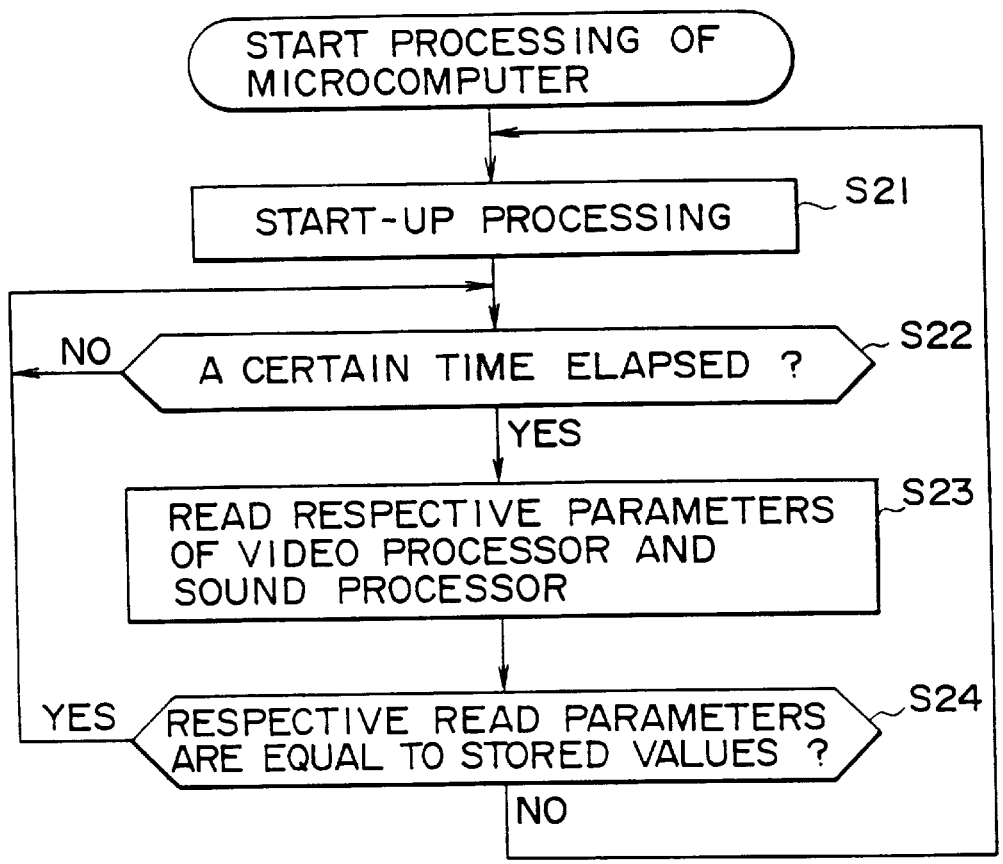
FIG. 3 is a flow chart for explaining another operational example of the embodiment shown in FIG. 1.

In the processing example shown in FIG. 2, abnormality has been detected using those parameters that are not used practically by the video processor 13 or the sound processor 15, but it is conceivable that, when the video processor 13 or the sound processor 15 showed an abnormal action, the parameters used practically in the television receiver 1 are also set to abnormal values. In this case, it is possible to detect the abnormality from the parameters used practically by the video processor 13 or the sound processor 15. FIG. 3 shows a processing example in this case.

Namely, in FIG. 3, start-up processing is executed first in a step S21. This start-up processing is one similar to the processing in the step S1 shown in FIG. 2.

Next, in a step S22, the process stands by until a preset certain time elapses and proceeds to a step S23 when a certain time has elapsed, and the microcomputer 12 reads the values of respective parameters that are set practically at that time in the video processor 13 or the sound processor 15. The video processor 13 or the sound processor 15 reads the values of the parameters that have been set practically out of the RAMs 31 and 32 when the input of this reading instruction is received from the microcomputer 12 and outputs these values to the microcomputer 12.

Next, the process proceeds to a step S24, where the microcomputer 12 compares the values of parameters that are set at that time by the video processor 13 or the sound processor 15 that are read in the step S23 with the values of respective parameters (values of parameters stored in the RAM 22) that the microcomputer 12 instructs setting thereof to the video processor 13 or the sound processor 15, thereby to decide whether both are equal to each other or not. When the video processor 13 or the sound processor 15 is acting normally, the values of parameters that the microcomputer 12 instructs setting thereof to the video processor 13 or the sound processor 15 and the values of parameters that are set practically by the video processor 13 or the sound processor 15 corresponding to the instruction are equal to each other. Accordingly, in this case, the process is returned to the step S22 and stands by until a certain time elapses, and processing in the step S23 and thereafter is executed repeatedly when a certain time has elapsed.

As against the above, when abnormality is generated in the video processor 13 or the sound processor 15, the values of the set parameters are updated to values different from the values of parameters instructed to be set by the microcomputer 12. Thus, in this case, it is decided that abnormality has been generated in the video processor 13 or the sound processor 15, the process is returned to the step S21 from a step S24 and start-up processing is executed. With this, the video processor 13 or the sound processor 15 are initialized similarly to the case at time of start-up of the power source, and processing is done over again from the beginning.

Besides, in this case, the microcomputer 12 and the video processor 13 or the sound processor 15 perform input processing of parameters and set processing of parameters shown in FIG. 8 and FIG. 9, respectively, similarly to the above-mentioned case.

In this manner, for example, the video processor 13 uses parameters for adjusting the brightness of the CRT 14 and the sound processor 15 uses parameters for setting the volume of an audio signal outputted from the speaker 16, thereby to detect the existence of abnormality, respectively, and can correct abnormality, if any.

Figure 4:
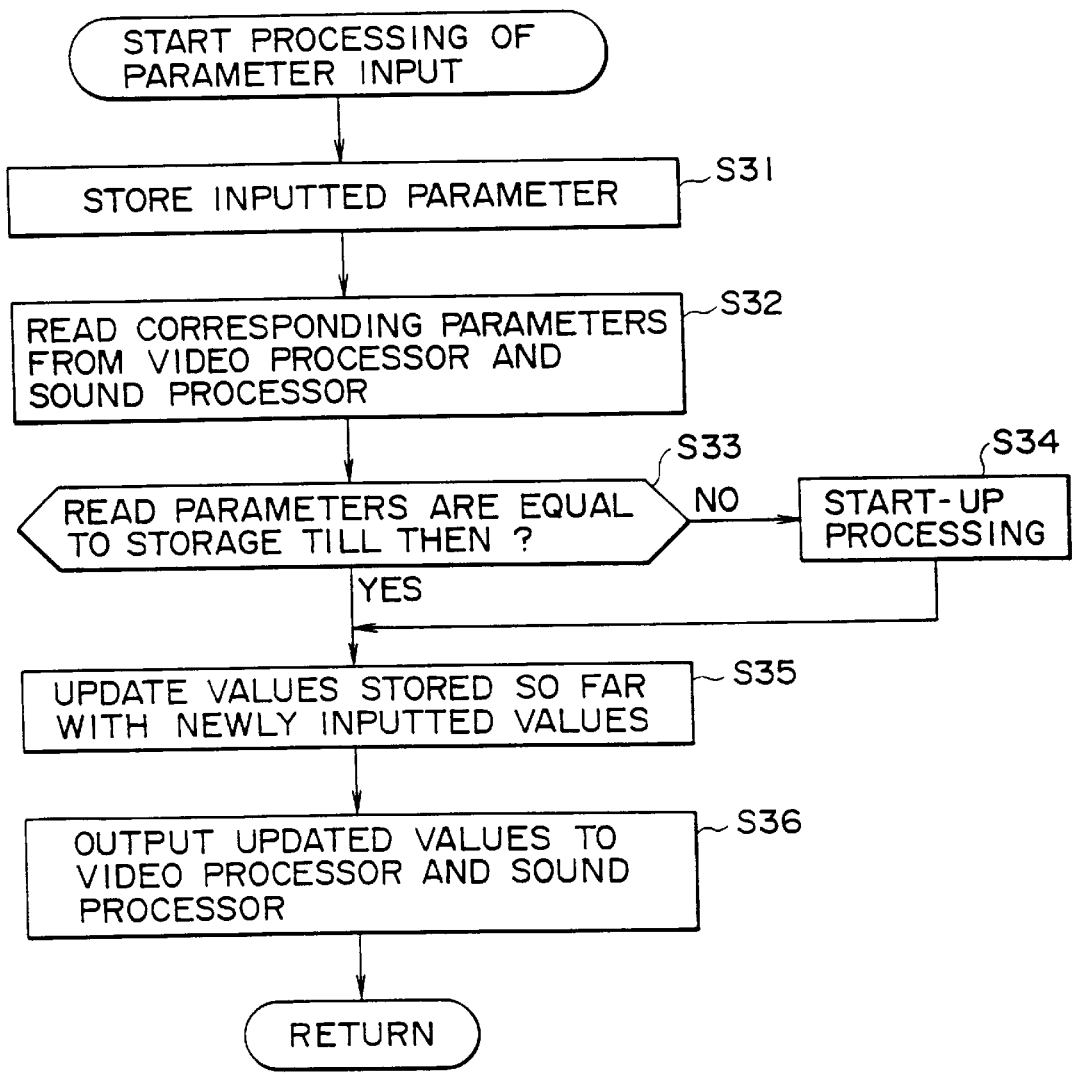
FIG. 4 is a flow chart showing still another operational example of the embodiment shown in FIG. 1.
Figure 5:
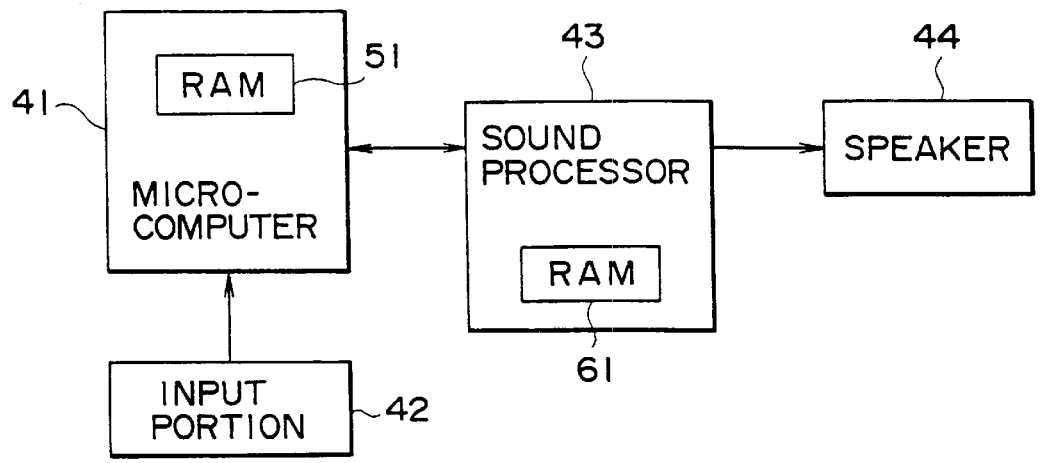
FIG. 5 is a block diagram showing a structure of a part of a conventional television receiver.
Figure 6:
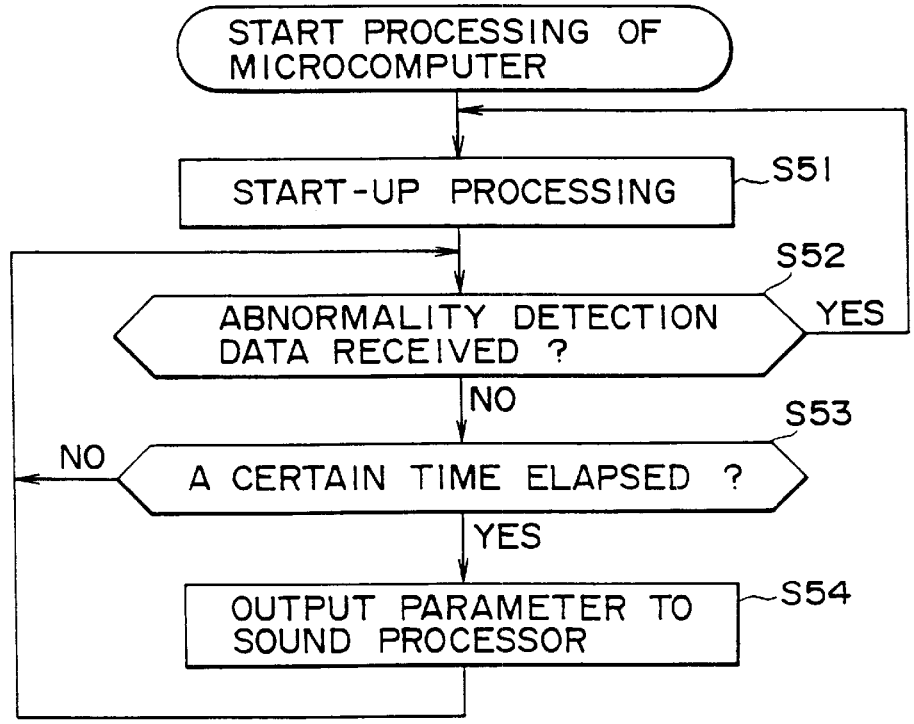
FIG. 6 is a flow chart showing a processing example when existence of abnormality in the microcomputer shown in FIG. 5 is detected.
Figure 7:
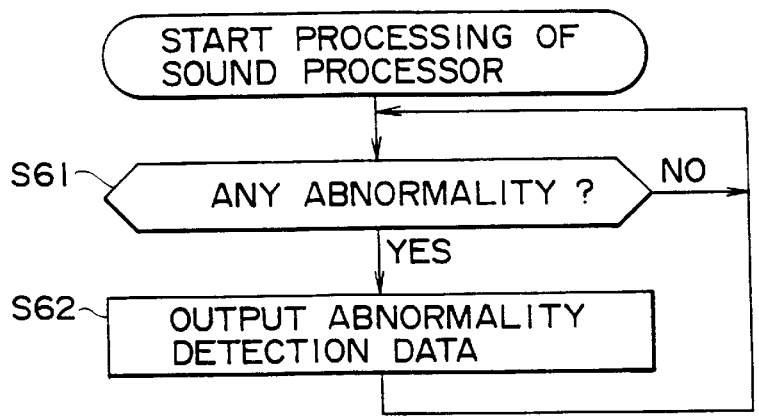
FIG. 7 is a flow chart showing abnormality detection processing of a sound processor shown in FIG. 5.

In the processing examples shown in FIG. 2 and FIG. 3, those parameters that have been set in the video processor 13 or the sound processor 15 are read periodically, thereby to detect existence of abnormality. Other than the above, however, it is also possible to arrange to detect existence of abnormality when the microcomputer 12 instructs the video processor 13 or the sound processor 15 to set parameters. FIG. 4 shows a processing example in this case.

Namely, the microcomputer 12 starts processing shown in a flow chart in FIG. 4 when setting of parameters is instructed from the remote control 2. Then, first, in a step S31, the microcomputer 12 stores inputted parameters in the RAM 22 by operating the remote control 2. Next, in a step S32, the values of parameters corresponding to those parameters that are stored in the step S31 are read from the video processor 13 and the sound processor 15.

Then, in a step S33, it is decided whether the values of parameters that have been set in the video processor 13 or the sound processor 15 read from the video processor 13 or the sound processor 15 are equal to the values of parameters the setting of which is instructed to the video processor 13 or the sound processor 15 or not. When both are equal to each other, it is decided that the video processor 13 or the sound processor 15 is acting normally, and the process is proceeded to a step S35, where the values of parameters stored in the RAM 22 so far at the point of time when setting is instructed to the video processor 13 or the sound processor 15 are updated with the values of parameters that have been stored in the step S31. Next, the process is proceeded to a step S36, and the updated values of parameters are outputted to the video processor 13 or the sound processor 15, thereby to set these values of parameters therein.

As against the above, when it is decided that the values of parameters of the video processor 13 or the sound processor 15 that have been read in the step S33 are different from the values of parameters stored in the RAM 22, it is decided that there is abnormality in the video processor 13 or the sound processor 15, and the step is proceeded to a step S34, where the video processor 13 or the sound processor 15 is controlled, thereby to execute start-up processing. Then, after the video processor 13 or the sound processor 15 is initialized, the process is proceeded to a step S35, where the values of parameters stored in the RAM 22 that have been instructed so far to the video processor 13 or the sound processor 15 are updated with the values of parameters stored in the step S31. Then, in a step S36, the updated values of parameters are outputted to the video processor 13 or the sound processor 15.

In such a manner as described above, when there is abnormality in the video processor 13 or the sound processor 15, it is possible to recover it to a normal state.

Besides, in the above-mentioned embodiment, when it is detected that the video processor 13 or the sound processor 15 is in an abnormal state, processing of starting up only the video processor 13 or the sound processor 15 again is executed, but it is also possible to process so as to start up the whole television receiver 1 again.

Further, in the above-mentioned embodiment, the video processor 13 and the sound processor 15 have been described as the example of a plurality of circuit portions, but it is also possible to constitute other circuits in a similar manner. Furthermore, it is a matter of course that electronic equipment of the present invention may be a VTR, a satellite broadcasting receiver and so on other than a television receiver.

As described above, according to the present invention, the values of parameters that have been set are compared with the values of parameters that have been instructed to be set, and a plurality of circuit portions are controlled corresponding to the results of comparison. Therefore, it becomes possible to detect existence of abnormality in a circuit portion quickly and surely even when the circuit portion has no function of detecting existence of abnormality.

What is claimed is:

1. Electronic equipment in which a plurality of circuit portions are connected mutually by an internal bus, comprising:
   a microcontroller connected to said internal bus for controlling said plurality of circuit portions through said internal bus; wherein:
      each of said plurality of circuit portions has a plurality of parameters that are set by said microcontroller and is provided with a memory for storing a set value for the parameter received from said microcontroller through said bus; and
      said microcontroller outputs the set values of said plurality of parameters to said plurality of circuit portions so as to store these set values in said memories of said plurality of circuit portions, reads the set values out of said memories of said plurality of circuit portions after the lapse of a predetermined time, and detects an abnormal state by comparing the set value sent to said plurality of circuit portions with the read out set value.

2. Electronic equipment according to claim 1, wherein said microcontroller sends said set value to said plurality of circuit portions when the power source of said electronic equipment is turned on.

3. Electronic equipment according to claim 2, wherein said microcontroller recognizes that the equipment is acting normally when the set value sent to said plurality of circuit portions and the read out set value coincide with each other, and recognizes that said plurality of circuit portions are in an abnormal state when the results of comparison do not coincide with each other, and performs processing at time of making power source.

4. Electronic equipment according to claim 3, wherein said microcontroller sends set values of parameters that are not used in said electronic equipment among the parameters.

5. Electronic equipment according to claim 3, further comprising a user function part for receiving an indication to alter a parameter from a user; wherein said microcontroller has a second memory, and said microcontroller:
   stores set values of parameters inputted from said user function part in said second memory;

reads out set values from said memories of said plurality of circuit portions;

detects abnormality by comparing a set value sent to said plurality of circuit portions with a read out set value; and sends a set value stored in said second memory to said plurality of circuit portions and stores the set value in said memory of said plurality of circuit portions when no abnormality is detected.

6. Electronic equipment according to claim 4, further comprising a user function part for receiving an indication to alter a parameter from a user, wherein said microcontroller has a second memory, and said microcontroller:

stores set values of parameters inputted to said second memory from said user function part;

reads out set values from said memory of said plurality of circuit portions;

detects abnormality by comparing the set values sent to said plurality of circuit portions with the read out set values; and sends the set values stored in said second memory to said plurality of circuit portions so as to store the set values in said memory of said plurality of circuit portions when no abnormality is detected.

7. A method of controlling electronic equipment in which a plurality of circuit portions connected mutually by an internal bus are controlled by a set value of a parameter given from a microcontroller connected to said internal bus, characterized in that said microcontroller:

outputs set values of said plurality of parameters to said plurality of circuit portions;

stores the set values in a memory provided in each of said plurality of circuit portions; reads the set value out of said memory after the lapse of predetermined time; and detects an abnormal state by comparing the set value sent to said plurality of circuit portions with the read out set value.

8. A method of controlling electronic equipment according to claim 7, wherein said microcontroller sends said set value to said plurality of circuit portions when the power source of said electronic equipment is turned on.

9. A method of controlling electronic equipment according to claim 8, wherein said microcontroller recognizes that the equipment is acting normally when the set value sent to said plurality of circuit portions and the read out set value coincide with each other, and recognizes that the equipment is in an abnormal state when the results of comparison are not in accord with each other and performs processing at time of making power source.

10. A method of controlling electronic equipment according to claim 9, wherein said microcontroller sends the set value of parameters that are not used in said electronic equipment among the parameters.

11. A method of controlling electronic equipment according to claim 9, wherein said microcontroller:

receives set values of parameters inputted by a user through a user function part;

stores received set values of parameters in a second memory;

reads set values out of said memories provided in said plurality of circuit portions;

compares the set value sent to said plurality of circuit portions with the read out set value; and sends the set value stored in said second memory to said plurality of circuit portions so as to store the set value in said memory provided in said plurality of circuit portions when the results of comparison are in accord with each other.

12. A method of controlling electronic equipment according to claim 10, wherein said microcontroller:

receives set values of parameters inputted by a user through a user function part;

stores received set values of parameters in a second memory;

reads set values out of said memories provided in said plurality of circuit portions;

compares the set value sent to said plurality of circuit portions with the read out set value; and sends the set value stored in said second memory to said plurality of circuit portions so as to store the set value in said memory provided in said plurality of circuit portions when the results of comparison are in accord with each other.

* * * * *